(12) United States Patent
Suzuki et al.

(10) Patent No.: US 11,869,179 B2
(45) Date of Patent: Jan. 9, 2024

(54) ABNORMAL PART DISPLAY APPARATUS, ABNORMAL PART DISPLAY SYSTEM, ABNORMAL PART DISPLAY METHOD, AND ABNORMAL PART DISPLAY PROGRAM

(71) Applicant: NEC Corporation, Tokyo (JP)

(72) Inventors: Shigeo Suzuki, Tokyo (JP); Taisuke Tanabe, Tokyo (JP); Hiroshi Matsumoto, Tokyo (JP); Takanori Shigeta, Tokyo (JP); Junichi Abe, Tokyo (JP); Akira Tsuji, Tokyo (JP); Yoshimasa Ono, Tokyo (JP); Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 17/193,136

(22) Filed: Mar. 5, 2021

(65) Prior Publication Data

US 2021/0287356 A1    Sep. 16, 2021

(30) Foreign Application Priority Data

Mar. 10, 2020  (JP) ................................ 2020-041198

(51) Int. Cl.
| | | |
|---|---|---|
| *G06T 7/00* | (2017.01) | |
| *G01S 17/86* | (2020.01) | |
| *G01S 17/42* | (2006.01) | |

(52) U.S. Cl.
CPC ............ *G06T 7/0004* (2013.01); *G01S 17/42* (2013.01); *G01S 17/86* (2020.01); *G06T 2207/30108* (2013.01)

(58) Field of Classification Search
CPC ......... G06T 2207/10028; G06T 19/006; G06T 2207/20081; G06T 2207/20084;
(Continued)

(56) References Cited

U.S. PATENT DOCUMENTS

2017/0337705 A1* 11/2017 Bendall ................. G01B 11/24
2019/0338666 A1   11/2019 Finn et al.
(Continued)

FOREIGN PATENT DOCUMENTS

| CN | 102713671 A | * 10/2012 | ............. G01B 11/24 |
|---|---|---|---|
| CN | 110458177 A | 11/2019 | |

(Continued)

OTHER PUBLICATIONS

Extended European Search Report for EP Application No. EP21156255.8 dated on Jul. 13, 2021.
(Continued)

*Primary Examiner* — Michael P Stafira (74) *Attorney, Agent, or Firm* — Sughrue Mion, PLLC (57) ABSTRACT

An abnormal part display apparatus, an abnormal part display system, an abnormal part displaying method, and an abnormal part displaying program capable of improving visibility of an abnormal part in an object are provided. An abnormal part display apparatus 11 according to the present disclosure includes an acquisition unit 111 configured to acquire point group data of an object obtained by measuring the object by using a laser ranging apparatus 12, and a photograph image of the object obtained by photographing the object by using a photographing apparatus 13, a display unit 112 configured to display the point group data and the photograph image on a predetermined screen, and a control unit 113 configured to control the point group data and the photograph image to be displayed in the display unit 112.

13 Claims, 3 Drawing Sheets

(58) Field of Classification Search
CPC ........... G06T 7/73; G06T 17/00; G06T 19/20; G06T 2207/30252; G06T 9/001; G06T 17/05; G06T 2207/10024; G06T 7/70; G06T 2200/24; G06T 7/11; G06T 9/00; G06T 7/74; G06T 2207/10016; G06T 7/55; G06T 2210/56; G06T 17/20; G06T 7/60; G06T 7/50; G06T 2200/04; G06T 2207/30244; G06T 7/521; G06T 2207/10032; G06T 2207/30196; G06T 2219/2012; G06T 7/90; G06T 11/60; G06T 15/04; G06T 7/20; G06T 1/20; G06T 2210/04; G06T 2219/024; G06T 11/00; G06T 9/40; G06T 15/10; G06T 19/00; G06T 7/0002; G06T 15/08; G06T 7/97; G06T 2215/16; G06T 7/593; G06T 7/33; G06T 2207/30184; G06T 7/80; G06T 2207/10004; G06T 19/003; G06T 2207/30248; G06T 7/62; G06T 7/00; G06T 7/13; G06T 7/246; G06T 15/506; G06T 5/50; G06T 2200/08; G06T 2207/10021; G06T 7/0004; G06T 2207/30256; G06T 7/75; G06T 2207/10012; G06T 15/50; G06T 2207/10152; G06T 2207/30261; G06T 2210/41; G06T 5/002; G06T 7/10; G06T 7/30; G06T 15/205; G06T 2207/30168; G06T 2219/2024; G06T 2207/30041; G06T 15/20; G06T 2210/12; G06T 2207/10148; G06T 2215/12; G06T 3/4038; G06T 13/40; G06T 2207/20221; G06T 3/40; G06T 2207/20021; G06T 2219/028; G06T 2207/30201; G06T 2219/2004; G06T 7/0012; G06T 7/579; G06T 2207/30204; G06T 15/00; G06T 2219/004; G06T 2219/2016; G06T 7/001; G06T 2207/10048; G06T 2207/20076; G06T 15/005; G06T 2207/10044; G06T 7/344; G06T 11/20; G06T 3/0093; G06T 3/4046; G06T 5/001; G06T 7/194; G06T 2207/30241; G06T 5/006; G06T 7/12; G06T 7/40; G06T 13/20; G06T 2207/30236; G06T 7/292; G06T 11/203; G06T 7/248; G06T 11/001; G06T 13/80; G06T 2210/22; G06T 9/004; G06T 17/10; G06T 2207/20132; G06T 5/005; G06T 2207/10081; G06T 2207/30232; G06T 1/60; G06T 17/005; G06T 2200/32; G06T 2219/2021; G06T 17/205; G06T 2207/30164; G06T 3/4084; G06T 7/174; G06T 2210/16; G06T 1/00; G06T 15/06; G06T 2200/28; G06T 2207/20072; G06T 2207/30268; G06T 3/0087; G06T 7/337; G06T 7/66; G06T 9/005; G06T 11/206; G06T 2207/10088; G06T 7/536; G06T 9/002; G06T 2207/20024; G06T 2207/20212; G06T 3/0056; G06T 3/4053; G06T 5/20; G06T 7/187; G06T 9/007; G06T 1/0007; G06T 2207/30004; G06T 2207/30108; G06T 2210/36; G06T 7/77; G06T 7/85; G06T 2207/20182; G06T 2207/30181; G06T 7/277; G06T 7/38; G06T 2207/10052; G06T 2207/10072; G06T 2207/10116; G06T 2207/20061; G06T 2207/30242; G06T 3/00; G06T 3/60; G06T 7/251; G06T 1/0014; G06T 2207/20032; G06T 2207/20101; G06T 2207/20104; G06T 2207/20224; G06T 2219/2008; G06T 3/0068; G06T 15/503; G06T 15/80; G06T 2207/20016; G06T 2207/30056; G06T 2210/08; G06T 3/20; G06T 7/0008; G06T 7/223; G06T 7/564; G06T 2200/16; G06T 2207/10036; G06T 2207/20092; G06T 2207/30132; G06T 2207/30208; G06T 2207/30221; G06T 2210/21; G06T 3/0037; G06T 3/0062; G06T 5/40; G06T 7/136; G06T 13/00; G06T 15/40; G06T 2207/20152; G06T 2207/20164; G06T 2207/30128; G06T 2207/30228; G06T 2210/44; G06T 3/0031; G06T 3/4007; G06T 7/262; G06T 7/32; G06T 7/543; G06T 2207/10132; G06T 2207/20056; G06T 2207/20112; G06T 2207/30156; G06T 2207/30212; G06T 2210/61; G06T 2210/62; G06T 2213/00; G06T 3/0006; G06T 3/005; G06T 5/00; G06T 7/162; G06T 7/215; G06T 9/20; G06T 11/40; G06T 2207/10136; G06T 2207/20192; G06T 2207/20208; G06T 2207/30048; G06T 2207/30061; G06T 2207/30081; G06T 2207/30088; G06T 2207/30096; G06T 2207/30188; G06T 2210/28; G06T 2219/008; G06T 2219/012; G06T 3/0012; G06T 3/4015; G06T 5/009; G06T 7/143; G06T 7/254; G06T 7/35; G06T 7/557; G06T 7/586; G06T 7/596; G06T 2200/36; G06T 2207/10104; G06T 2207/30016; G06T 2207/30068; G06T 2211/40; G06T 3/0075; G06T 5/003; G06T 7/0014; G06T 7/155; G06T 7/42; G06T 7/44; G06T 7/49; G06T 7/529; G06T 7/68; G06T 15/30; G06T 15/55; G06T 15/60; G06T 2207/10008; G06T 2207/10064; G06T 2207/10108; G06T 2207/20012; G06T 2207/20044; G06T 2207/20048; G06T 2210/24; G06T 2210/32; G06T 3/0043; G06T 5/10; G06T 7/149; G06T 7/285; G06T 7/507; G06T 7/571; G06T 7/64; G06T 9/008; G01S 17/89; G01S 17/86; G01S 17/931; G01S 7/4808; G01S 17/42; G01S 17/08; G01S 13/931; G01S 17/894; G01S 7/4817; G01S 17/06; G01S 19/42; G01S 13/867; G01S 5/16; G01S 7/497; G01S 17/88; G01S 7/4802; G01S 7/51; G01S 13/865; G01S 13/89; G01S 15/89; G01S 13/86; G01S 2013/93271; G01S 17/87; G01S 19/13; G01S 17/02; G01S 2013/9316; G01S 2013/9322; G01S 15/08; G01S 17/46; G01S 2013/9318; G01S 7/40; G01S 7/4972; G01S 19/45; G01S 7/4818; G01S 13/08; G01S 2013/9323; G01S 15/931; G01S 19/01; G01S 19/14; G01S 5/0027; G01S 17/10; G01S 7/003; G01S 7/417; G01S 13/87; G01S 2013/93185; G01S 2013/9319; G01S 17/66; G01S 17/875; G01S 19/071; G01S 7/4813; G01S 13/02; G01S 13/723; G01S 17/933; G01S 2013/932; G01S 2013/9321; G01S 2013/9325; G01S 19/485; G01S 13/06; G01S 19/46; G01S 7/484; G01S 15/86; G01S 17/50; G01S 17/93; G01S 7/4812; G01S 7/4815; G01S 13/42; G01S 13/862; G01S 15/06; G01S 15/46; G01S 19/51; G01S 3/7864; G01S 5/10; G01S 13/885; G01S 15/02; G01S 19/06; G01S 5/163; G01S 17/18; G01S 2013/9324; G01S 17/48; G01S 7/412; G01S 7/4816; G01S 7/52004; G01S 19/07; G01S 19/20; G01S 19/23; G01S 19/47; G01S 13/90; G01S 19/235; G01S 19/26; G01S 19/48; G01S 5/0284; G01S 19/41; G01S 3/785; G01S 3/7868; G01S 5/0072; G01S 5/02585; G01S 7/4026; G01S 7/4804; G01S 11/04; G01S 11/14; G01S 13/9023; G01S 17/04; G01S 17/95; G01S 19/12; G01S 19/15; G01S 2013/93273; G01S 2013/93275; G01S 2015/938; G01S 5/0009; G01S 5/0252; G01S 5/0289; G01S 5/30; G01S 7/03; G01S 7/04; G01S 7/24; G01S 7/4814; G01S 7/483; G01S 7/486; G01S 1/68; G01S 11/12; G01S 13/74; G01S 17/34; G01S 17/36; G01S 17/58; G01S 19/03; G01S 19/35; G01S 19/49; G01S 2007/4977; G01S 2013/93272; G01S 2013/93274; G01S 3/8083; G01S 5/02; G01S 5/0273; G01S 5/20; G01S 5/28; G01S 7/282; G01S 7/2955; G01S 7/35; G01S 7/41; G01S 7/4811; G01S 7/4865; G01S 1/00; G01S 1/805; G01S 13/34; G01S 13/726; G01S 13/876; G01S 15/93; G01S 17/006; G01S 19/073; G01S 19/22; G01S 19/258; G01S 19/28; G01S 19/396; G01S 19/40; G01S 19/43; G01S 2013/93277; G01S 2015/937; G01S 2201/06; G01S 2205/01; G01S 5/0278; G01S 5/145; G01S 5/22; G01S 7/22; G01S 7/406; G01S 7/4082; G01S 7/4091; G01S 7/481; G01S 7/4863; G01S 7/495; G01S 1/0423; G01S 1/0428; G01S 11/02; G01S 13/426; G01S 13/58; G01S 13/88; G01S 13/881; G01S 13/882; G01S 13/91; G01S 13/92; G01S 15/00; G01S 15/8993; G01S 17/00; G01S 19/00; G01S 19/05; G01S 19/19; G01S 19/21; G01S 19/37; G01S 19/393; G01S 19/425; G01S 19/50; G01S 19/52; G01S 2007/4975; G01S 2013/9314; G01S 2013/9315; G01S 2201/01; G01S 2205/008; G01S 2205/02; G01S 3/043; G01S 3/48; G01S 3/50; G01S 3/782; G01S 3/789; G01S 5/018; G01S 5/0205; G01S 5/0242; G01S 5/0244; G01S 5/02521; G01S 5/02522; G01S 5/02526; G01S 5/02527; G01S 5/0268; G01S 5/08; G01S 5/14; G01S 5/18; G01S 7/027; G01S 7/20; G01S 7/4004; G01S 7/411; G01S 7/4861; G01S 7/487; G01S 7/4876; G01S 7/4913; G01S 7/4914; G01S 7/4915

See application file for complete search history.

(56) References Cited

U.S. PATENT DOCUMENTS

2019/0378315 A1* 12/2019 Oshikiri ............. G01N 21/8851
2020/0193195 A1* 6/2020 Doria .................. G06V 20/582

FOREIGN PATENT DOCUMENTS

| | | | | |
|---|---|---|---|---|
| JP | H10-318805 A | 12/1998 | | |
| JP | 2003-032589 A | 1/2003 | | |
| JP | 2004-212129 A | 7/2004 | | |
| JP | 2015-175629 A | 10/2015 | | |
| JP | 2018045587 A | * | 3/2018 | ........... G06T 15/005 |
| JP | 2018-136340 A | 8/2018 | | |
| JP | 2019-023568 A | 2/2019 | | |
| JP | 2019095876 A | * | 6/2019 | |
| JP | 2019101986 A | * | 6/2019 | |
| JP | 2019-124659 A | 7/2019 | | |
| JP | 2020021465 A | * | 2/2020 | |
| WO | 2014/091837 A1 | 6/2014 | | |
| WO | 2019/031386 A1 | 2/2019 | | |
| WO | WO-2019163211 A1 | * | 8/2019 | |

OTHER PUBLICATIONS

JP Office Action for JP Application No. 2020-041198, dated Nov. 14, 2023 with English Translation.

* cited by examiner

ABNORMAL PART DISPLAY APPARATUS, ABNORMAL PART DISPLAY SYSTEM, ABNORMAL PART DISPLAY METHOD, AND ABNORMAL PART DISPLAY PROGRAM

INCORPORATION BY REFERENCE

This application is based upon and claims the benefit of priority from Japanese patent application No. 2020-041198, filed on May 10, 2020, the disclosure of which is incorporated herein in its entirety by reference.

TECHNICAL FIELD

The present disclosure relates to an abnormal part display apparatus, an abnormal part display system, an abnormal part displaying method, and an abnormal part displaying program. In particular, the present disclosure relates to an abnormal part display apparatus, an abnormal part display system, an abnormal part displaying method, and an abnormal part displaying program capable of improving visibility of an abnormal part in an object.

BACKGROUND ART

In order to specify an abnormal part in an object, a user acquires point group data of the object by using a laser ranging apparatus (e.g., a LiDAR (Light Detection and Ranging) apparatus). Then, after the obtained point group data is processed, the processed point group data is displayed, for example, on a screen of a terminal such as a personal computer. The user specifies the abnormal part in the object by viewing the displayed data.

International Patent Publication No. WO2014/091837 discloses that: "point group data of a member and 3D (three-dimensional) CAD data thereof are acquired; each of the point group data and the 3D CAD data is divided into a plurality of segments; a first graph in which the segments obtained by dividing the point group data are plotted as nodes, and a second graph in which the segments obtained by dividing the 3D CAD data are plotted as nodes are generated; matching between the first graph and the second graph is obtained; parts of the member, based on which the point group data has been acquired, are classified into parts of which 3D CAD data exist and parts of which no 3D CAD data exist based on the result of the matching: a 3D model which is based on the point group data is generated based on the result of the classification; and when there is 3D CAD data of the member, based on which the point group data has been acquired, the 3D model is generated by referring to the 3D CAD data". However, International Patent Publication No. WO2014/091837 fails to disclose a feature that "point group data of an object measured by a laser ranging apparatus and a photograph image taken by a photographing apparatus are displayed on a predetermined screen (on the same screen)".

Japanese Unexamined Patent Application Publication No. 2015-175629 discloses that: "a distance measuring apparatus separates, in an optical axis in an optical system that receives light containing reflected light coming from an object, which is generated by applying light containing infrared light emitted from a light source unit to a point on the object, into infrared light and visible light by using a wavelength selecting mirror; the distance measuring apparatus detects the separated infrared light by using a photodetector and thereby generates a signal for distance measurement therefrom, and detects the separated visible light by using a color sensor and thereby generates a signal for color information therefrom; and the distance measuring apparatus includes a rotation unit that scans a plurality of target points on an object, and an aggregation unit that synchronously acquires, for the same target point, the signal for distance measurement, the signal for color information, and a signal representing a scanning state, and calculates a distance to the target point by using these signals and obtains colored point group data". However, Japanese Unexamined Patent Application Publication No. 2015-175629 fails to disclose a feature that "point group data of an object measured by a laser ranging apparatus and a photograph image taken by a photographing apparatus are displayed on a predetermined screen (on the same screen)".

As described above, a user specifies an abnormal part in an object by using a laser ranging apparatus. However, although point group data for specifying an abnormal part contains information about the shape of an object, information about the color of the object is scarce, thus causing a problem that when a user views point group data displayed on a screen, the visibility thereof is not satisfactory. That is, there is a problem that it is difficult to intuitively understand what is displayed on the screen.

An example object of the present disclosure is to provide an abnormal part display apparatus, an abnormal part display system, an abnormal part displaying method, and an abnormal part displaying program capable of solving at least one of the above-described problems.

SUMMARY

In a first example aspect, an abnormal part display apparatus includes:
  an acquisition unit configured to acquire point group data of an object obtained by measuring the object by using a laser ranging apparatus, and a photograph image of the object obtained by photographing the object by using a photographing apparatus;
  a display unit configured to display the point group data and the photograph image on a predetermined screen; and
  a control unit configured to control the point group data and the photograph image to be displayed in the display unit.

In another example aspect, an abnormal part display system includes a laser ranging apparatus, a photographing apparatus, and an abnormal part display apparatus, in which
  the laser ranging apparatus acquires point group data of an object by measuring the object,
  the photographing apparatus acquires a photograph image of the object by photographing the object, and
  the abnormal part display apparatus includes:
  an acquisition unit configured to acquire the point group data of the object measured by the laser ranging apparatus, and the photograph image of the object photographed by the photographing apparatus;
  a display unit configured to display the point group data and the photograph image on a predetermined screen; and
  a control unit configured to control the point group data and the photograph image to be displayed in the display unit.

In another example aspect, a method for displaying an abnormal part includes:
  acquiring point group data of an object obtained by measuring the object, and a photograph image of the object obtained by photographing the object;

displaying the point group data and the photograph image on a predetermined screen; and controlling the point group data and the photograph image to be displayed.

In another example aspect, an abnormality position displaying program causes a computer to:

acquire point group data of an object obtained by measuring the object, and a photograph image of the object obtained by photographing the object;

display the point group data and the photograph image on a predetermined screen; and control the point group data and the photograph image to be displayed.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Example embodiments according to the present disclosure will be described hereinafter with reference to the drawings. The same or corresponding elements are denoted by the same symbols throughout the drawings, and redundant explanations are omitted as appropriate for the sake of clarity.

Example Embodiment

A configuration of an abnormal part display apparatus according to an example embodiment will be described.

Figure 1:
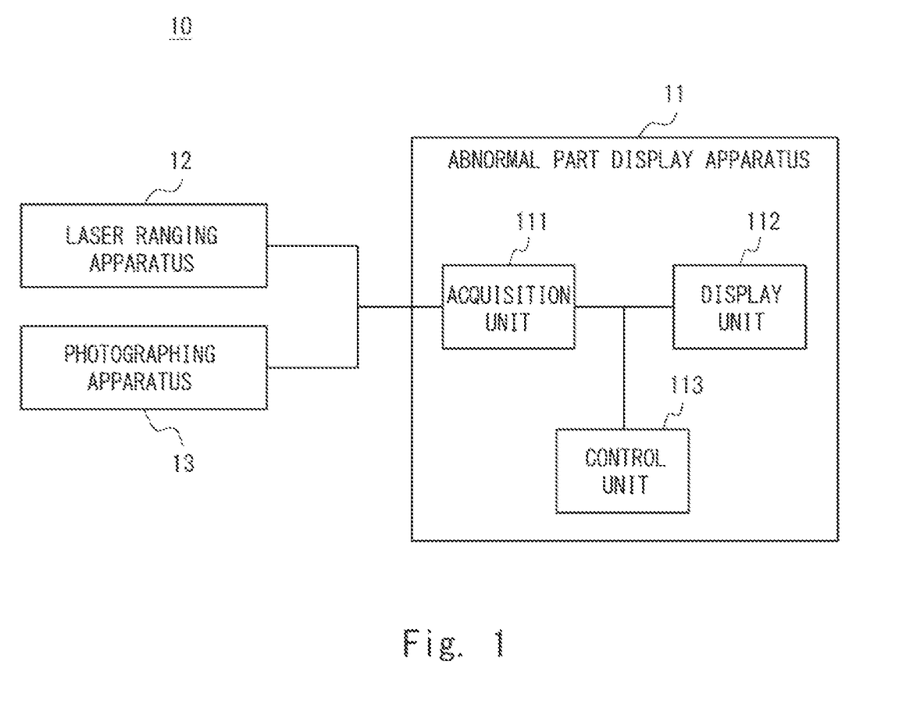
FIG. 1 is a block diagram showing an example of an abnormal part display apparatus according to an example embodiment.

FIG. 1 is a block diagram showing an example of an abnormal part display apparatus according to an example embodiment.

Figure 2:
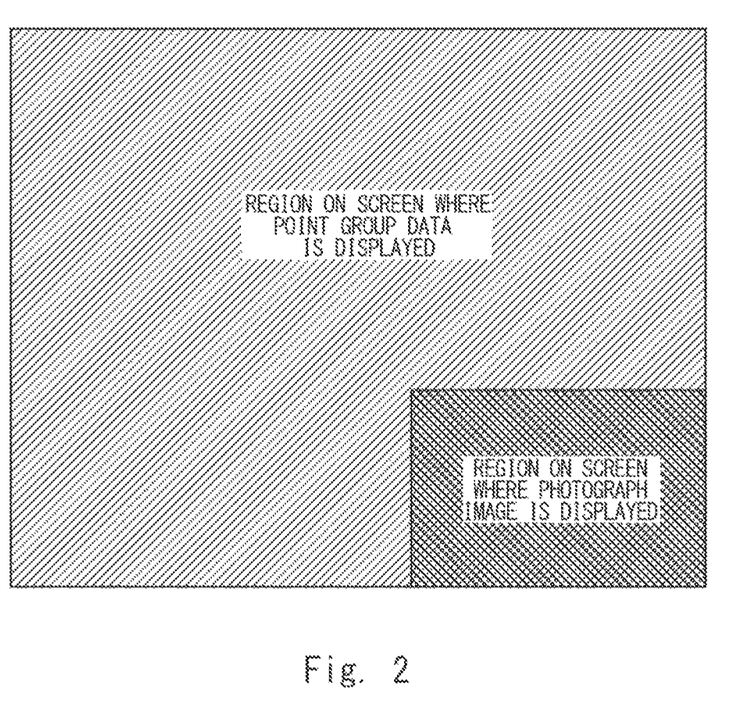
FIG. 2 shows an example of a screen of a display unit of an abnormal part display apparatus according to an example embodiment.

FIG. 2 shows an example of a screen of a display unit of the abnormal part display apparatus according to the example embodiment.

As shown in FIG. 1, the abnormal part display system 10 according to the example embodiment includes a laser ranging apparatus 12, a photographing apparatus 13, and an abnormal part display apparatus 11.

The laser ranging apparatus 12 acquires point group data of an object by measuring the object. Specifically, the laser ranging apparatus 12 detects an abnormal part in the object by applying a laser to the object, acquiring data about the distance to the object in a three-dimensional manner by measuring the luminance of reflected light of the applied laser, comparing the acquired distance data with a measurement result that is obtained in advance in a normal state (i.e., in a state in which there is no abnormal part in the object), and obtaining a difference between the acquired distance data and the measured result. The abnormal part detected by the laser ranging apparatus 12 is displayed in the form of point group data on a display unit 112. The laser ranging apparatus 12 can detect an abnormal part in an object even when the user cannot move close to the object (or cannot visit the place where the object is located) and thus cannot directly check the abnormal part therein, or when any person cannot move close to the object (or cannot visit the place where the object is located) because the detection is performed at night.

The photographing apparatus 13 photographs the object and acquires a photograph image of the object. The photographing apparatus 13 is, for example, a camera. It is desirable that, in principle, the laser ranging apparatus 12 and the photographing apparatus 13 measure or photograph an object from the same place. However, in practice, it is difficult to measure or photograph the object from the same place. Therefore, the measurement or the photographing is performed under the condition that the distance between the measurement place at which the laser ranging apparatus 12 measures the object and the photographing place at which the photographing apparatus 13 photographs the object is equal to or shorter than a predetermined distance, i.e., within a predetermined permissible range. A photograph image is also referred to as a camera image.

The abnormal part display apparatus 11 includes an acquisition unit 11, a display unit 112, and a control unit 113. The acquisition unit 111 acquires the point group data of the object measured by the laser ranging apparatus 12 and the photograph image of the object photographed by the photographing apparatus 13.

The display unit 112 displays the point group data and the photograph image on a predetermined screen. Specifically, as shown in FIG. 2, the point group data and the photograph image are displayed in such a manner that a part of a region on the screen in which the point group data is displayed is overlapped with a region on the screen in which the photograph image is displayed. By displaying the point group data and the photograph image on the predetermined screen (on the same screen) as described above, the visibility of the point group data is improved as compared to the case where only the point group data is displayed. Note that FIG. 2 is merely an example as to how the point group data and the photograph image are displayed, and the way of displaying them is not limited this example.

The control unit 113 controls the point group data and the photograph image to be displayed in the display unit 112.

For example, the control unit 113 may control the display unit 112 so that it displays a plurality of measurement places at which the laser ranging apparatus 12 has measured the object and a plurality of photographing places at which the photographing apparatus 13 has photographed the object. Then, when the user selects a certain measurement place from among the plurality of measurement places and selects a certain photographing place from among the plurality of photographing places based on the content (i.e., the image) displayed in the display unit 112, the control unit 113 may display, in the display unit 112, point group data that has been obtained by the laser ranging apparatus 12 from the selected certain measurement place and a photograph image that has been taken by the photographing apparatus 13 from the selected certain photographing place.

Note that when the laser ranging apparatus 12 detects that there is an abnormal part on the surface of the object, the control unit 113 may display, in the display unit 112, point group data within a certain area including the abnormal part and a photograph image within the certain area.

When the laser ranging apparatus 12 detects that there is an abnormal part on the surface of the object, the control unit 113 may display a selection screen for selecting the abnormal part in the display unit 112. Then, when the user selects a certain abnormal part based on the selection screen, the control unit 113 may display point group data within a certain area including the certain abnormal part and a photograph image within the certain area. In this way, the user selects an abnormal part that he/she wants to check, and the point group data and the photograph image of the selected abnormal part are displayed.

When the laser ranging apparatus 12 detects that there is an abnormal part on the surface of the object, the control unit 113 may determine a photograph image that is displayed together with the point group data in the display unit 112 based on brightness at the time when the photograph image was taken.

Specifically, the control unit 113 may select (or may use) a photograph image that was taken when the brightness at the time of photographing was equal to or higher than predetermined brightness as the photograph image that is displayed together with the point group data in the display unit 112. The brightness may be determined, for example, based on the illuminance measured by an illuminometer.

The control unit 113 may determine the photograph image that is displayed together with the point group data in the display unit 112 based on information about a weather forecast.

Specifically, the control unit 113 may select a photograph image that was taken when the weather at the time of the photographing was fine as the photograph image that is displayed together with the point group data in the display unit 112. Alternatively, the control unit 113 may select a photograph image that was taken when the weather at the time of the photographing was weather other than the rainy weather as the photograph image that is displayed together with the point group data in the display unit 112.

In the case of a photograph image that was taken in a backlit state (e.g., was taken against the sun), the control unit 113 may select a photograph image that was taken in a state other than the backlit state as the photograph image that is displayed together with the point group data in the display unit 112.

When the laser ranging apparatus 12 detects that there is an abnormal part on the surface of the object, the control unit 113 may determine the photograph image that is displayed together with the point group data in the display unit 112 based on the luminance or the lightness of the photograph image.

Specifically, the control unit 113 may select a photograph image whose luminance is equal to or higher than a predetermined luminance value or a photograph image whose lightness is equal to or higher than predetermined lightness as the photograph image that is displayed together with the point group data in the display unit 112.

The control unit 113 may display, in the display unit 112, a point group data that is measured at a first time point and a photograph image that is taken at a second time point which is a predetermined time earlier than the first time point. The first time point is, for example, a time point in the night, and the second time point is, for example, a time point in the daytime.

By using a photograph image taken in the daytime, i.e., by using a suitable photograph image in the past, instead of using a photograph image taken at night as described above, the visibility for the user is improved.

As described above, the abnormal part display apparatus 11 displays point group data of an object that is obtained by measuring the object by using the laser ranging apparatus 12 and a photograph image (i.e., a camera image) of the object that is obtained by photographing the object by using the photographing apparatus 13 on a predetermined screen of the display unit 112 side by side (i.e., in a predetermined arrangement).

The visibility of the point group data is worse than that of the photograph image. However, by displaying the point group data and the photograph image side by side (i.e., in a predetermined arrangement), the visibility for the user is improved as compared to the case where only the point group data is displayed. Further, when there is an abnormal part in the object, the user can specify the abnormal part more precisely.

As a result, according to the example embodiment, it is possible to provide an abnormal part display apparatus and an abnormal part display system capable of improving the visibility of an abnormal part in an object.

A data flow in the abnormal part display system according to the example embodiment will be described.

Figure 3:
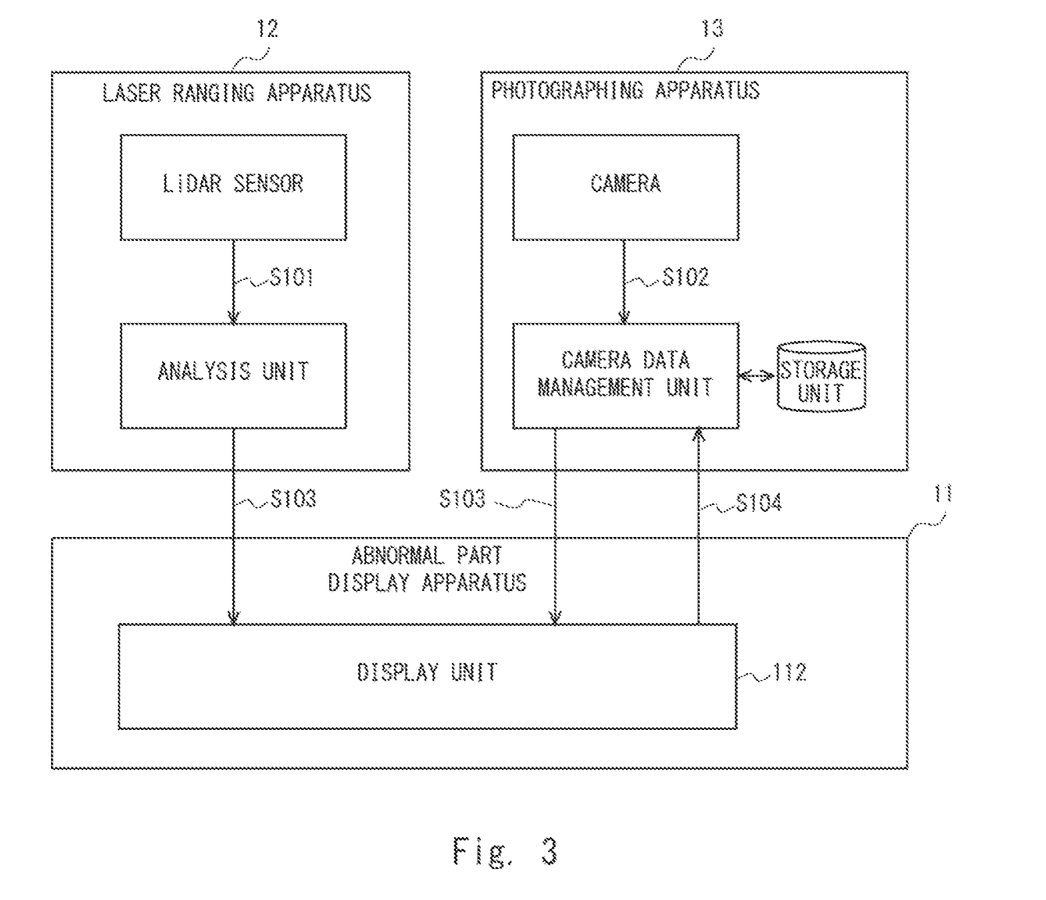
FIG. 3 is a block diagram showing an example of a data flow in an abnormal part display system according to an example embodiment.

FIG. 3 is a block diagram showing an example of a data flow in the abnormal part display system according to the example embodiment.

In FIG. 3, the illustration of the acquisition unit 111 and the control unit 113 is omitted for simplifying the drawing.

As shown in FIG. 3, an analysis unit of the laser ranging apparatus 12 acquires, from a LiDAR sensor of the laser ranging apparatus 12, point group data that is obtained by the LiDAR sensor at a certain measurement place at a certain time (step S101). Note that an arbitrary timing can be set as the time at which point group data is acquired (i.e., as the sampling timing).

A camera data management unit of the photographing apparatus 13 acquires, from a camera of the photographing apparatus 13, a photograph image that is taken by the camera at the certain measurement place at the certain time (i.e., at the same place and at the same time at which the LiDAR sensor has acquired the point group data) (step S102). The camera data management unit stores the acquired photograph image in a storage unit, and takes out (i.e., reads) the stored photograph image from the storage unit as the need arises.

The display unit 112 of the abnormal part display apparatus 11 displays the point group data obtained by the LiDAR sensor and the photograph image taken by the camera (step S103). Alternatively, the display unit 112 may display the point group data and the photograph image only when the laser ranging apparatus 12 detects an abnormal part in the object.

When the visibility of the photograph image (the camera image) is poor because, for example, the detection is performed at night, the display unit 112 displays past photograph image stored in the storage unit instead of displaying the current photograph image (step S104). That is, the display unit 112 may search photograph images in the past and display a suitable photograph image in the past. Alternatively, the display unit 112 may display the photograph image while arbitrarily switching the displayed photograph image among photograph images that were taken at certain time points and at certain places specified by the user.

Note that although the present disclosure is described as a hardware configuration in the above-described example embodiments, the present disclosure is not limited to the hardware configurations. In the present disclosure, the processes in each of the components can also be implemented by having a CPU (Central Processing Unit) execute a computer program.

The program can be stored and provided to a computer using any type of non-transitory computer readable media.

Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, and RAM (Random Access Memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a radio communication line.

Although the present disclosure is explained above with reference to embodiments, the present disclosure is not limited to the above-described embodiments. Various modifications that can be understood by those skilled in the art can be made to the configuration and details of the present disclosure within the scope of the invention.

Note that the present invention is not limited to the above-described example embodiments, and they may be modified as appropriate without departing from the spirit and scope of the invention.

The whole or part of the example embodiments disclosed above can be described as, but not limited to, the following supplementary notes.

(Supplementary Note 1)
An abnormal part display apparatus comprising:
an acquisition unit configured to acquire point group data of an object obtained by measuring the object by using a laser ranging apparatus, and a photograph image of the object obtained by photographing the object by using a photographing apparatus;
a display unit configured to display the point group data and the photograph image on a predetermined screen; and
a control unit configured to control the point group data and the photograph image to be displayed in the display unit.

(Supplementary Note 2)
The abnormal part display apparatus described in Supplementary note 1, wherein a distance between a measurement place at which the laser ranging apparatus measures the object and a photographing place at which the photographing apparatus photographs the object is equal to or shorter than a predetermined distance.

(Supplementary Note 3)
The abnormal part display apparatus described in Supplementary note 2, wherein
the control unit displays, in the display unit, a plurality of measurement places at which the laser ranging apparatus measures the object and a plurality of photographing places at which the photographing apparatus photographs the object, and
when a certain measurement place is selected from the plurality of measurement places and a certain photographing place is selected from the plurality of photographing places, the control unit displays, in the display unit, the point group data measured by the laser ranging apparatus from the selected certain measurement place and the photograph image taken by the photographing apparatus from the selected certain photographing place.

(Supplementary Note 4)
The abnormal part display apparatus described in any one of Supplementary notes 1 to 3, wherein when the laser ranging apparatus detects that there is an abnormal part on a surface of the object, the control unit displays, in the display unit, the point group data within a certain area including the abnormal part and the photograph image within the certain area.

(Supplementary Note 5)
The abnormal part display apparatus described in any one of Supplementary notes 1 to 3, wherein
when the laser ranging apparatus detects that there is an abnormal part on a surface of the object, the control unit displays a selection screen for selecting the abnormal part in the display unit, and
when a certain abnormal part is selected based on the selection screen, the control unit displays the point group data within a certain area including the certain abnormal part and the photograph image within the certain area.

(Supplementary Note 6)
The abnormal part display apparatus described in any one of Supplementary notes 1 to 3, wherein when the laser ranging apparatus detects that there is an abnormal part on a surface of the object, the control unit determines the photograph image that is displayed together with the point group data in the display unit based on brightness at the time when the photograph image was taken.

(Supplementary Note 7)
The abnormal part display apparatus described in Supplementary note 6, wherein the control unit uses the photograph image that was taken when the brightness at the time of photographing was equal to or higher than predetermined brightness as the photograph image that is displayed together with the point group data in the display unit.

(Supplementary Note 8)
The abnormal part display apparatus described in any one of Supplementary notes 1 to 3, wherein when the laser ranging apparatus detects that there is an abnormal part on a surface of the object, the control unit determines the photograph image that is displayed together with the point group data in the display unit based on luminance or lightness of the photograph image.

(Supplementary Note 9)
The abnormal part display apparatus described in Supplementary note 8, wherein the control unit selects the photograph image whose luminance is equal to or higher than a predetermined luminance value or the photograph image whose lightness is equal to or higher than predetermined lightness as the photograph image that is displayed together with the point group data in the display unit.

(Supplementary Note 10)
The abnormal part display apparatus described in any one of Supplementary notes 1 to 3, wherein the control unit displays, in the display unit, the point group data that is obtained at a first time point and the photograph image that is taken at a second time point, the second time point being a predetermined time earlier than the first time point.

(Supplementary Note 11)
The abnormal part display apparatus described in Supplementary note 10, wherein the first time point is a time point in the night, and the second time point is a time point in the daytime.

(Supplementary Note 12)
The abnormal part display apparatus described in any one of Supplementary notes 1 to 11, wherein the photographing apparatus is a camera.

(Supplementary Note 13)

An abnormal part display system comprising a laser ranging apparatus, a photographing apparatus, and an abnormal part display apparatus, wherein
- the laser ranging apparatus acquires point group data of an object by measuring the object,
- the photographing apparatus acquires a photograph image of the object by photographing the object, and
- the abnormal part display apparatus comprises:
- an acquisition unit configured to acquire the point group data of the object measured by the laser ranging apparatus, and the photograph image of the object photographed by the photographing apparatus;
- a display unit configured to display the point group data and the photograph image on a predetermined screen; and
- a control unit configured to control the point group data and the photograph image to be displayed in the display unit.

(Supplementary Note 14)

A method for displaying an abnormal part comprising:
- acquiring point group data of an object obtained by measuring the object, and a photograph image of the object obtained by photographing the object;
- displaying the point group data and the photograph image on a predetermined screen; and controlling the point group data and the photograph image to be displayed.

(Supplementary Note 15)

A program for causing a computer to:
- acquire point group data of an object obtained by measuring the object, and a photograph image of the object obtained by photographing the object;
- display the point group data and the photograph image on a predetermined screen; and
- control the point group data and the photograph image to be displayed.

According to the present disclosure, it is possible to provide an abnormal part display apparatus, an abnormal part display system, an abnormal part displaying method, and an abnormal part displaying program capable of improving visibility of an abnormal part in an object.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An abnormal part display apparatus comprising:
at least one memory acquiring storing instructions and
at least one processor configured to execute the instructions to:
- acquire point group data of an object obtained by measuring the object by using a laser ranging apparatus, and a photograph image of the object obtained by photographing the object by using a photographing apparatus;
- display the point group data and the photograph image on a predetermined screen;
- control the point group data and the photograph image to be displayed using the at least one processor; and
- when the laser ranging apparatus detects that there is an abnormal part on a surface of the object, determine the photograph image that is displayed together with the point group data using the at least one processor based on brightness at the time when the photograph image was taken.

2. The abnormal part display apparatus according to claim 1, wherein a distance between a measurement place at which the laser ranging apparatus measures the object and a photographing place at which the photographing apparatus photographs the object is equal to or shorter than a predetermined distance.

3. The abnormal part display apparatus according to claim 2, wherein the at least one processor is further configured to execute the instructions to:
- display, using the at least one processor, a plurality of measurement places at which the laser ranging apparatus measures the object and a plurality of photographing places at which the photographing apparatus photographs the object, and
- when a certain measurement place is selected from the plurality of measurement places and a certain photographing place is selected from the plurality of photographing places, display, using the at least one processor, the point group data measured by the laser ranging apparatus from the selected certain measurement place and the photograph image taken by the photographing apparatus from the selected certain photographing place.

4. The abnormal part display apparatus according to claim 1, wherein the at least one processor is further configured to execute the instructions to, when the laser ranging apparatus detects that there is an abnormal part on a surface of the object, display, using the at least one processor, the point group data within a certain area including the abnormal part and the photograph image within the certain area.

5. The abnormal part display apparatus according to claim 1, wherein the at least one processor is further configured to execute the instructions to,
- when the laser ranging apparatus detects that there is an abnormal part on a surface of the object, display a selection screen for selecting the abnormal part using the at least one processor, and
- when a certain abnormal part is selected based on the selection screen, display the point group data within a certain area including the certain abnormal part and the photograph image within the certain area.

6. The abnormal part display apparatus according to claim 1, wherein the at least one processor is further configured to execute the instructions to use the photograph image that was taken when the brightness at the time of photographing was equal to or higher than predetermined brightness as the photograph image that is displayed together with the point group data using the at least one processor.

7. The abnormal part display apparatus according to claim 1, wherein the at least one processor is further configured to execute the instructions to, when the laser ranging apparatus detects that there is an abnormal part on a surface of the object, determine the photograph image that is displayed together with the point group data using the at least one processor based on luminance or lightness of the photograph image.

8. The abnormal part display apparatus according to claim 7, wherein the at least one processor is further configured to execute the instructions to select the photograph image whose luminance is equal to or higher than a predetermined luminance value or the photograph image whose lightness is equal to or higher than predetermined lightness as the photograph image that is displayed together with the point group data using the at least one processor.

9. The abnormal part display apparatus according to claim 1, wherein the at least one processor is further configured to execute the instructions to display, using the at least one processor, the point group data that is obtained at a first time point and the photograph image that is taken at a second time point, the second time point being a predetermined time earlier than the first time point.

10. The abnormal part display apparatus according to claim 9, wherein the first time point is a time point in the night, and the second time point is a time point in the daytime.

11. The abnormal part display apparatus according to claim 1, wherein the photographing apparatus is a camera.

12. An abnormal part display system comprising a laser ranging apparatus, a photographing apparatus, and an abnormal part display apparatus, wherein the laser ranging apparatus acquires point group data of an object by measuring the object,
the photographing apparatus acquires a photograph image of the object by photographing the object, and
the abnormal part display apparatus comprises:
an acquisition unit configured to acquire the point group data of the object measured by the laser ranging apparatus, and the photograph image of the object photographed by the photographing apparatus;
a display unit configured to display the point group data and the photograph image on a predetermined screen; and
a control unit configured to control the point group data and the photograph image to be displayed in the display unit,
wherein when the laser ranging apparatus detects that there is an abnormal part on a surface of the object, the control unit determines the photograph image that is displayed together with the point group data in the display unit based on brightness at the time when the photograph image was taken.

13. A method for displaying an abnormal part comprising:
acquiring point group data of an object obtained by measuring the object, and a photograph image of the object obtained by photographing the object;
displaying the point group data and the photograph image on a predetermined screen; and
controlling the point group data and the photograph image to be displayed; and
when detecting that there is an abnormal part on a surface of the object, determining the photograph image that is displayed together with the point group data in the predetermined screen based on brightness at the time when the photograph image was taken.

* * * * *